United States Patent [19]

Schlosser

[11] Patent Number: 5,221,188

[45] Date of Patent: Jun. 22, 1993

[54] BLADE DEVICE FOR TURBO-ENGINES

[75] Inventor: Werner Schlosser, Munich, Fed. Rep. of Germany

[73] Assignee: MTU Motoren-Und Turbinen-Union Munchen GmbH, Fed. Rep. of Germany

[21] Appl. No.: 811,966

[22] Filed: Dec. 23, 1991

[30] Foreign Application Priority Data

Dec. 21, 1990 [DE] Fed. Rep. of Germany ....... 4041104

[51] Int. Cl.$^5$ .............................................. B64C 11/16
[52] U.S. Cl. ...................................... 416/230; 416/95; 416/97 A; 416/223 R
[58] Field of Search .......... 416/223 A, 229 R, 229 A, 416/230, 241 R, 241 B, 95, 96 R, 97 A, 96 A; 29/421.1, 463, 889.7, 889.71, 889.72, 889.722

[56] References Cited

U.S. PATENT DOCUMENTS

| | | | |
|---|---|---|---|
| 2,780,435 | 2/1957 | Jackson | 253/39.15 |
| 2,958,505 | 11/1960 | Frank | 253/39.15 |
| 3,394,918 | 7/1968 | Wiseman | 416/241 |
| 3,726,604 | 4/1973 | Helms et al. | 416/97 A |
| 3,902,820 | 10/1975 | Amos | 416/96 A |
| 4,060,413 | 11/1977 | Mazzei et al. | 29/889.71 |
| 4,772,450 | 10/1988 | Friedman | 29/889.7 |
| 4,992,026 | 2/1991 | Ohtomo et al. | 416/96 A |
| 5,083,371 | 1/1992 | Leibfried et al. | 29/889.7 |

FOREIGN PATENT DOCUMENTS 0722341 1/1955 United Kingdom ................ 416/500

OTHER PUBLICATIONS

Patent Abstract No. 55-32915 of Japan; Mar., 1980.
Transactions of the ASME, 79 (1957.04), 3, Research on Application of Cooling to Gas Turbines, J. B. Esgar, J. N. B. Livingood, Ro.Oh. Hickel.

Primary Examiner—Edward K. Look
Assistant Examiner—Mark Sgantzos
Attorney, Agent, or Firm—Evenson, McKeown, Edwards & Lenahan

[57] ABSTRACT

A blade device for turbo-engines, comprising a blade shell, a blade core and a blade base, has a blade core comprising a bundle of small tubes which provides the blade device with high stability and stiffness. The arrangement has the advantage that the blade device can be used universally in the case of almost all blade devices, and the blade core permits a heat exchanger function.

23 Claims, 3 Drawing Sheets

BLADE DEVICE FOR TURBO-ENGINES

BACKGROUND AND SUMMARY OF THE INVENTION

This invention relates to a blade device for turbo-engines and, more particularly, to a blade device for fan jet engines and propellers including a blade base having a blade connected with it. On the inside of the blade, small tubes are arranged next to one another which extend between the base and the tip of the blade.

A blade device of the above-described type is known from the German Patent Document DE-PS 715 421.

The progress of today's flight propulsion systems, particularly of fan jet engines, is reflected in increasing jet thrust and more economical overall efficiency. A considerable part of this success is attributable to the optimized blading of the fan as well as of the compressor and of the turbines of the used gas turbines. The limit of the technical possibilities, in this case, is usually determined by the thermally and mechanically highly stressed blade devices of the rotors. The reason is that an effective increase of efficiency and thrust is a function of a corresponding rise of the turbine entry temperature. This measure is expediently accompanied by an increase of the rotational speed of the shaft. This explains the increasing demands on the thermal and mechanical stability, under load, of today's engine blade devices. In the case of complexly-shaped blade devices, such as the blade devices of a propfan, it is particularly difficult to combine a corresponding stability with the necessary reliability.

Within the scope of the above-mentioned problems, it is known from the U.S. Pat. No. 3,644,059 to construct turbine blades including a profile-determining shell, an opene cell honeycomb structure connected with the shell, and a device for the guiding of cooling air. On the opening side, this honeycomb structure is connected with the shell and extends into the interior of the profile. It is the object of this development to permit transpiration cooling of the blade device and to reinforce the structure of the blade device. However, the provided alignment of the honeycomb structure, i.e. the webs of the honeycombs extending transversely to the longitudinal direction of the blade device, in principle, does not permit any suitable load transmission in the longitudinal direction of the blade device. Since, as is known, the rotating blade devices of a gas turbine are subject to considerable centrifugal forces, the alignment of the honeycombs proves to be disadvantageous. The hollow strut, which is provided for the reinforcement of the blade device, not only results in a weight increase but also, because of its complex shape, considerably raises the manufacturing expenditures during production. In order to ensure a considerable cooling of the blade device, cooling ducts are additionally provided in the longitudinal direction of the blade device which further increase the manufacturing expenditures and weaken the honeycomb structure.

German Patent Document DE-PS 715 421 describes a turbine blade device which has small tubes which fill the blade profile. The small tubes are coated and are connected with one another by means of a welding deposit, i.e. the small tubes are embedded in the welding deposit. The profile surface is formed by the welding deposit connecting the small tubes. Since the spaces between tubes combined into a bundle require a considerable proportion of the cross-sectional area of the profile, the filling of these spaces with a welding deposit, which is heavy in comparison to the small tubes, results in a clear weight increase of the blade device. In addition the welding deposit prevents a predominant load transmission by the small tubes into the blade base. Therefore, the welding deposit not only has the comparatively unproblematic task of joining the small tubes but, in addition, has a load-transmitting and heat-transmitting effect. In addition to these influences, the welding deposit on the profile surface is also subjected to erosive influences of the fluid flowing around the blade device which are particularly pronounced in the case of turbine blade devices. Since, in principle, the welding deposit is susceptible to stress corrosion cracking, it is doubtful whether this material is suitable for surfaces of blade devices in turbo-engines, particularly in flight propulsion systems with high requirements with respect to safety.

Although a hollow turbine blade device known from the U.S. Pat. No. 3,623,825 provides the use of a plurality of tubes in the longitudinal shaft of the blade device for the cooling of the blade device, because of their special installed position in a special chamber, these tubes are not suitable for absorbing blade loads and meaningfully introducing the loads into the blade base.

U.S. Pat. No. 2,866,618 also discloses the use of small tubes inside a turbine blade device, but again only for cooling purposes. Since the small tubes are not included in the blade structure in a load-transmitting manner, they also have a weight-increasing effect.

On the basis of the above, there is therefore needed a blade device having an aviation-type construction such that loads occurring during operation are appropriately introduced into the blade base or, in the case of guide blades, into the shrouds. In addition, a process is needed for the manufacturing of the blade device.

The present invention meets these needs by providing a blade formed by a separate blade shell, which provides the blade device with a profile, and a blade core arranged in the hollow space of the blade shell. The blade core consists of a bundle of tightly packed small tubes, which are firmly connected with one another. Hollow spaces between the small tubes remain predominantly free of a connecting agent. The blade core is firmly connected with the blade base and with the interior side of the blade shell by way of small tubes resting against the blade shell.

The arrangement according to the present invention has the advantage of introducing loads, resulting particularly from centrifugal forces, into the blade base by way of the bundle of small tubes extending in the longitudinal direction of the blade device without any further deflections of the thrust flow and/or the flow of force by way of additional components. Therefore, tension peaks are avoided or at least significantly reduced which increases the lifetime of the blade device and saves weight. The distribution of the loads to a plurality of small tubes increases the operational reliability in the case of damage to the blade device caused by impacting foreign bodies, such as pieces of ice, rocks and birds (FOD) since the load of the damaged small tubes is deflected to adjacent undamaged small tubes, and thus an escalation of the damage is avoided. The redundancy principle was therefore used in a consequent manner. At the same time, the bundle not only permits the absorption and transmission of the load but, if required, makes available a heat exchanger function by way of the small tubes extending in the longitudinal direction of the blade device. The very large surface of the small tubes permits a very large heat flow and thus a high cooling capacity. However, as a protection against icing-up when the meteorological conditions are unfavorable, propellers often require a de-icing device. A heating of the propeller blades by way of the small tubes is ideally suited for this purpose. Because of this invention, a weight-intensive separation of the load and the head-transmitting components is not necessary. As a result of the invention, the manufacturing costs of a turbo-engine can be markedly decreased because of the use of small tubes or bundles of small tubes which are easy to manufacture.

For reasons of a more advantageous producibility, an alternative development provides the constructing of the blade shell of two thin halves which are connected with one another, the first half forming the pressure side, and the second have forming the suction side of the blade shell.

Further additional developments are provided for the purpose of an optimal heat transmission between the blade shell and the blade core, or a fluid flowing through the bundle, a load introduction from the blade shell into the blade core that is as direct as possible, as well as an aviation-type construction.

In a preferred embodiment, the size of the cross-sectional surface of the small tubes is in the range of from 1 $mm^2$ to 314 $mm^2$. The advantage of this construction is not only the fact that the size of the small tubes can be flexibly adapted to the blade profile thickness but also that small tubes are offered by many manufacturers in this size range. The bundle can also be formed by small tubes having an elliptical cross-sectional surface.

In a further preferred embodiment, the small tubes of a bundle have different lengths. It is advantageous in this case that the cross-sectional surface of the small tubes does not have to be adapted to the blade profiles which normally become thinner and shorter radially toward the outside. The construction according to the characteristic of having the number of small tubes of a blade cross-section decrease as the profile thickness is reduced also contributes to this advantage.

An advantageous embodiment provides that the small tubes are curved such that they follow the blade warp. The high-expenditure cutting of the bundle to fit the plan of the blade can therefore be reduced during manufacturing. In addition, it is possible to extend the small tubes of extensively curved blade devices into the blade base and connect them to a coolant or heating agent supply.

The construction in which the small tubes are fastened in the blade base is advantageous. Thus, flow of force diversions, which cause undesirable tensions in the concerned components, can be avoided. There is therefore a direct introduction of the blade loads into the arrangement receiving the blade device.

The construction is advantageous in which at least one portion of the small tubes, on their base-side end, are connected to a duct for the feeding of the coolant or heating agent. This permits a simple supply of the heating agent or coolant to the bundle. A targeted cooling or heating effect at special locations of the blade device is permitted by the fact that selected small tubes are connected to the duct. In the case of moving blades, the coolant or heating agent flow from the blade base radially toward the outside is advantageously promoted by the centrifugal force effect.

An additional advantageous further development for the targeted distribution of the coolant or heating agent inside the blade core is permitted because of the fact that the small tubes have lateral openings which connect the interiors of adjacent small tubes. In this case, an additional construction is advantageous in which the outside of the blade shell and the interiors of the small tubes directly connected with the blade shell are connected with one another by way of openings. As a result, a film cooling of the blade device can be produced which increases the cooling effect.

Another advantageous construction is achieved by the fact that at least a portion of the small tubes are closed on their end which is opposite the blade base. As a result, if required, a coolant or heating agent flow can be directed in a targeted manner into selected blade areas, and thus, for example, thermally higher stressed blade areas can have priority when being supplied with the correspondingly apportioned coolant. By means of this targeted coolant supply, the amount of tapped compressor air for the cooling of the blades can be reduced. This increases the efficiency of the cyclic process. In addition, the firm closure increases the stiffness of the small tube and therefore that of the blade device. The development wherein a portion of the small tubes are closed off at their base-side end also contributes to these advantages.

The construction ideally meets the basically different requirements with respect to the stiffness and/or stability of a blade device, according to which the small tubes to be closed off are each firmly closed off by means of a pin extending into the small tubes, in which case the length of the pin inside a respective small tube is adapted to the required stiffness and/or stability of the blade device. A locally different desired stability and/or stiffness inside the blade can be achieved just as advantageously. The development wherein a portion of the small tubes are replaced by wires, the location and the number of the wires being adapted to the required stiffness and/or stability of the blade device, also contributes to this advantage.

A process for the manufacturing of a blade device includes the process steps of: compiling a bundle of small tubes; connecting the bundle of small tubes with a blade base; deforming the bundle into the shape of a blade profile; joining a blade shell with the bundle and the blade base; and connecting the small tubes with one another. The process connects the small tubes with one another and/or with the blade base or the blade shell via diffusion bonding. Also, the small tubes can be connected with the blade base via hard soldering. The deforming of the bundle includes the step of high-temperature isostatically pressing the bundle into the shape of the blade profile. The blade shell is produced by a power-metallurgical sheathing of the bundle. The blade shell is manufactured by at least one of a soldering-together and diffusion bonding of preformed sheet metal or forged mold halves.

The process has the further advantage that the individual process steps can be automated, and an economical mass production of the blade therefore becomes possible.

Other objects, advantages and novel features of the present invention will become apparent from the following detailed description of the invention when considered in conjunction with the accompanying drawings.

DETAILED DESCRIPTION OF THE DRAWINGS

Figure 1:
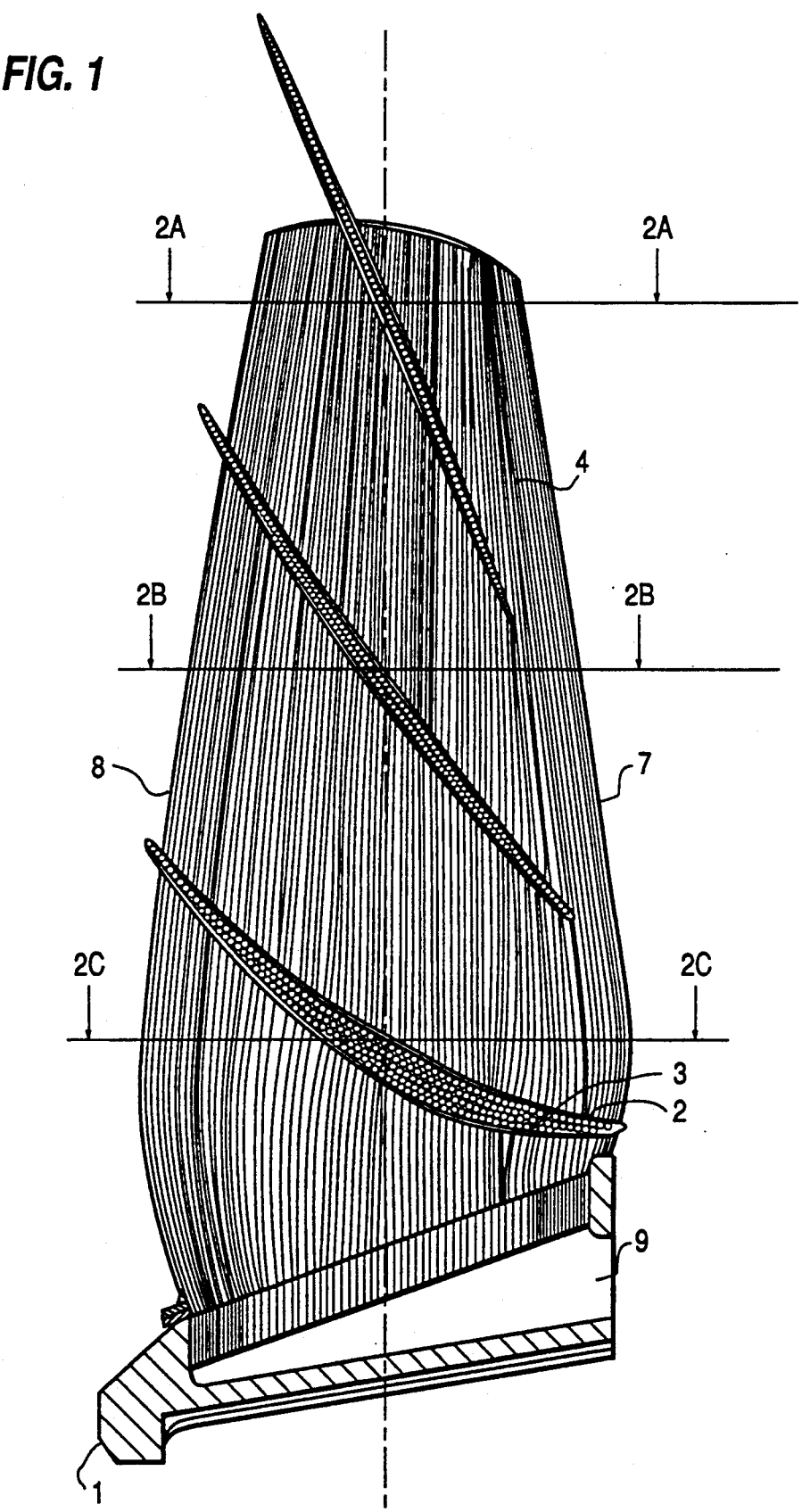
FIG. 1 is a longitudinal sectional view of a rotor blade device illustrating three examples of blade cross-sections which are folded in the plane of the drawing.

The sectional view of FIG. 1 illustrates the construction of a rotor blade device. As seen from FIGS. 1 and 2, the blade device comprises a blade shell 2 sheathing the blade core 3 and a blade base 1 connecting the blade shell 2 with the blade core 3. A pressure side 5 and a suction side 6 of the blade shell 2, in each case, are formed by a correspondingly shaped blade half. The interior of the blade device, i.e. the blade core 3, is formed by a bundle of small round tubes 4 which extend along the longitudinal direction of the blade device. These tubes 4 are connected with one another, with the blade shell 2 and with the blade base 1. The small tubes 4, which end in the blade base 1, by way of a duct 9, are connected to a device for supplying coolant (not shown in detail).

Figure 2:
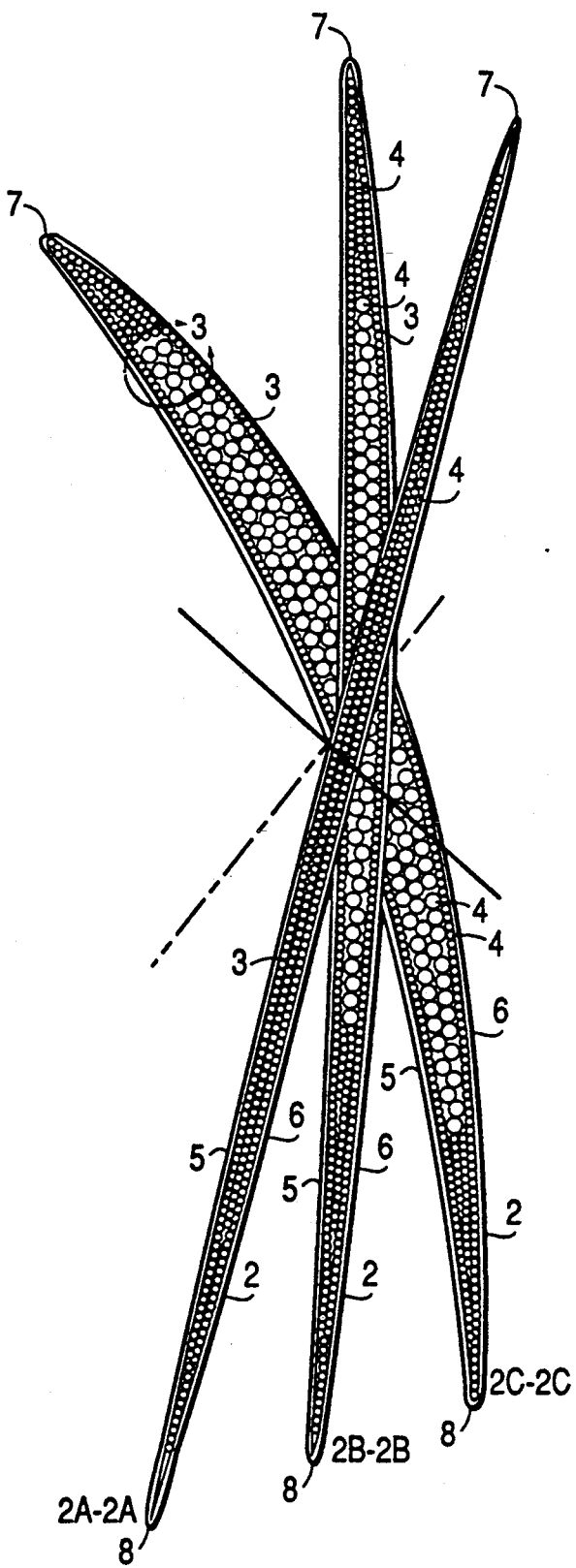
FIG. 2 is an enlarged representation of the blade cross-sections A—A, B—B and C—C illustrated in FIG. 1, in which the sections are shown disposed above one another in order to show the blade offset.

FIG. 2 shows three blade cross-sections having small round tubes 4 of two different diameters. The thinner small tubes 4 are arranged along the interior side of the blade shell 2 and the area of the leading edge 7 and of the trailing edge 8 of the blade. The thicker small tubes 4 extend in the interior of the blade core 3. The number of thicker small tubes decreases correspondingly as the profile thickness is reduced.

Figure 3:
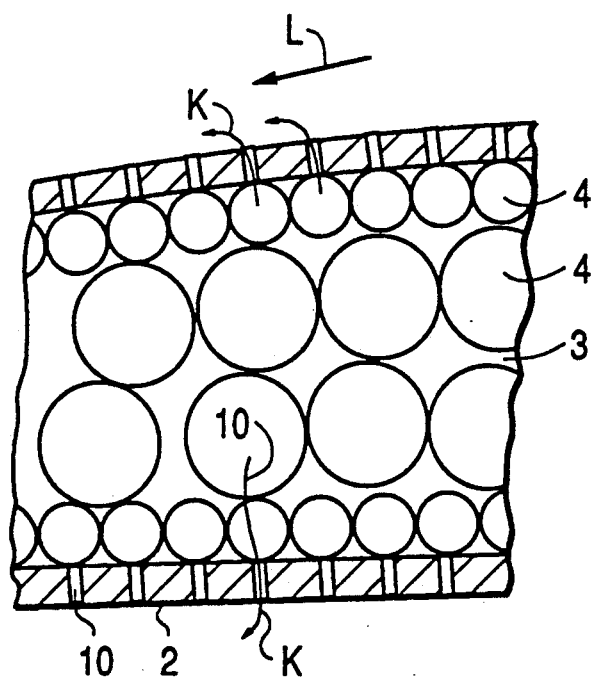
FIG. 3 is an enlarged representation of the cutout section III in FIG. 2.

FIG. 3 illustrates a cutout section of FIG. 2 in which the blade shell 2 is provided with bores 10 for the purpose of discharging the cooling air. The bores each connect the interiors of the thin small pipes 4 resting against the blade shell 2 with the outside of the blade for the formation of a cooling film K on the outside of the blade.

FIG. 2 also shows a number of small tubes being closed off by pins 20 which extend into the small tubes. The length of the pins 20 inside a respective small tube is adapted to the required stiffness and stability of the blade device.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A blade device for turbo-engines, comprising:
a blade base;
a blade connected to said blade base;
wherein said blade includes
a separate blade shell having a hollow interior and providing a profile for the blade;
a blade core arranged in the hollow interior, said blade core comprising a plurality of small hollow tubes forming a bundle, each of said small tubes having a constant cross section along its length, packed tightly together and firmly connected with one another, said bundle including hollow spaces formed between the small tubes which remain predominantly free of a connecting agent; and
wherein said blade core is firmly connected with said blade base and an interior side of said blade shell through the small tubes resting against the blade shell and wherein loads are introduced into said blade base via said blade shell and blade core.

2. A blade device according to claim 1, wherein the bundle has a blade-profile-type cross-section.

3. A blade device according to claim 1, wherein the bundle is formed of small tubes with at least one of a circular and elliptic cross-sectional surface.

4. A blade device according to claim 1, wherein the bundle comprises small tubes having different sized cross-sectional surfaces.

5. A blade device according to claim 1, wherein the small tubes which are connected with the interior side of the blade shell have a smaller cross-sectional surface than the small tubes further inside the bundle.

6. A blade device according to claim 1, wherein the small tubes have a smaller cross-sectional surface in the area of at least one of a leading edge and a trailing edge of the blade than in the area disposed in-between.

7. A blade device according to claim 1, wherein the bundle comprises small tubes having different lengths.

8. A blade device according to claim 7, wherein the number of small tubes of a blade cross-section decreases as the profile thickness is reduced.

9. A blade device according to claim 1, wherein said blade has a blade warp and the small tubes are curved in such a manner that they follow the blade warp.

10. A blade device according to claim 1, further comprising:
a duct for supplying a coolant or heating agent;
wherein at least a portion of the small tubes, on their base-side end, are connected to the duct.

11. A blade device according to claim 10, wherein the small tubes have lateral openings which connect the interiors of adjacent small tubes.

12. A blade device according to claim 10, wherein the outside of the blade shell and the interiors of the small tubes directly connected with the blade shell are connected with one another by way of openings.

13. A blade device according to claim 11, wherein the outside of the blade shell and the interiors of the small tubes directly connected with the blade shell are connected with one another by way of openings.

14. A blade device according to claim 1, wherein at least a portion of the small tubes are closed off at their base-side end or on their end situated opposite the blade base.

15. A blade device according to claim 14, wherein the small tubes to be closed off are each closed off by pin means extending into the small tubes, the length of the pin means inside a respective small tube being adapted to at least one of the required stiffness and stability of the blade device.

16. A blade device according to claim 1, wherein a portion of the small tubes are replaced by wires, the location and the number of the wires being adapted to the required stiffness and/or stability of the blade device.

17. A process for manufacturing a blade device the process comprising the steps of:
a) compiling a bundle of small tubes;
b) connecting the bundle of small tubes with a blade base;

c) deforming the bundle into the shape of a blade profile;
d) joining a blade shell with the bundle and the blade base; and
e) connecting the small tubes with one another via diffusion.

18. A process according to claim 17, wherein the small tubes are connected with the blade base via hard soldering.

19. A process according to claim 17, wherein the step of deforming includes the step of high-temperature isostatically pressing the bundle into the shape of the blade profile.

20. A process according to claim 17, wherein the blade shell is produced by a powder-metallurgical sheathing of the bundle.

21. A process according to claim 17, wherein the blade shell is manufactured by at least one of a soldering-together and diffusion bonding of preformed sheet metal or forged mold halves.

22. A blade device according to claim 1, wherein the small tubes are squeezed during manufacture of the bundle.

23. A blade device for turbo-engines, comprising:
a blade base;
a blade connected to said blade base;
a plurality of small tubes arranged next to one another inside said blade, said small tubes extending between said blade base and a tip of said blade;
wherein said blade includes
a separate blade shell having a hollow interior and providing a profile for the blade;
a blade core arranged in the hollow interior, said blade core comprising a bundle of the small tubes packed tightly together and firmly connected with one another, said bundle including hollow spaces formed between the small tubes which remain predominantly free of a connecting agent;
wherein said blade core is firmly connected with said blade base and an interior side of said blade shell through the small tubes resting against the blade shell, said blade device further comprising:
a duct for supplying a coolant or heating agent;
wherein at least a portion of the small tubes, on their base-side end, are connected to the duct; and
wherein the small tubes have lateral openings which connect the interiors of adjacent small tubes.

* * * * *